United States Patent [19]

Kamio et al.

[11] 3,709,503

[45] Jan. 9, 1973

[54] SPEED CHANGING DEVICE OF AUTOMATIC RECORD PLAYERS

[75] Inventors: Kenzo Kamio, Shijonawate-shi; Seizo Miyoshi, Hirakata-shi, both of Japan

[73] Assignee: Matsushita Electric Industrical Co., Ltd., Osaka, Japan

[22] Filed: Nov. 12, 1970

[21] Appl. No.: 88,864

[30] Foreign Application Priority Data

Nov. 21, 1969 Japan ................................44/93758

[52] U.S. Cl. ..................................................274/9 A

[51] Int. Cl. ..........................G11b 3/00, G11b 25/04

[58] Field of Search .....................274/9 A, 105, 39 A

[56] References Cited

UNITED STATES PATENTS

| | | | |
|---|---|---|---|
| 3,547,449 | 12/1970 | Dennis | 274/9 A |
| 3,329,435 | 7/1967 | Koepke | 274/10 S |
| 3,162,447 | 12/1964 | Hartman | 274/9 A |

*Primary Examiner*—William D. Martin, Jr.
*Assistant Examiner*—Steven L. Stephan
*Attorney*—Stevens, Davis, Miller & Mosher

[57] ABSTRACT

A speed changing device for use in an automatic record players wherein a plurality of disc records stacked on a spindle are dropped on a turntable and played one after another automatically and successively. An adapter for use with 45 r.p.m. records is mounted on the spindle, whereby the position of an idler pivotally connected to one end of the spindle is shifted and the speed of the turntable is changed from 33 1/3 r.p.m. to 45 r.p.m.

2 Claims, 3 Drawing Figures

Figure 1:
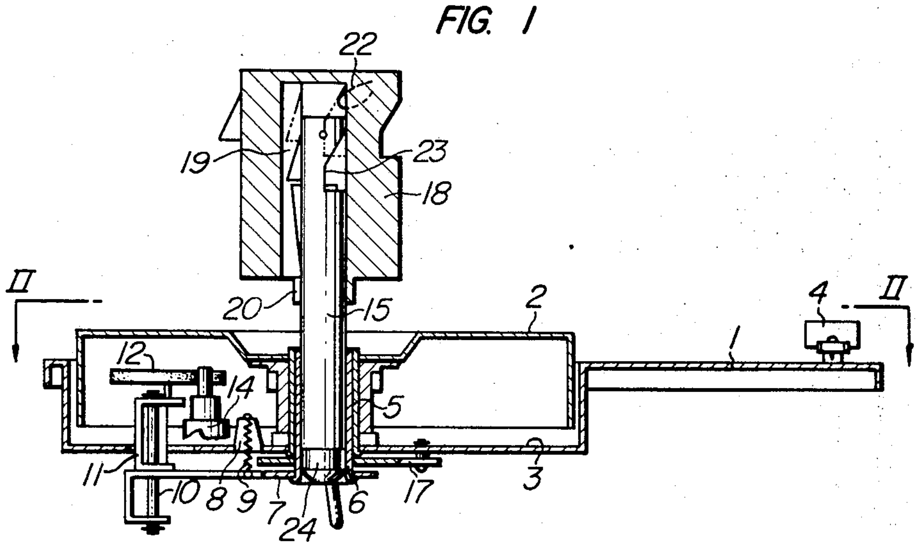

K. KAMIO & S. MIYOSHI
INVENTORS

BY Stevens, Davis, Miller & Mosher
ATTORNEYS

SPEED CHANGING DEVICE OF AUTOMATIC RECORD PLAYERS

The present invention relates to a speed changing device of automatic record players, such as automatic record changers, which is so designed that the rotational speed of a turntable is changed from 33 ⅓ r.p.m. to 45 r.p.m. by means of an adapter mounted on a disc record supporting spindle.

As a record player, an automatic record changer has been used, in which a plurality of disc records, stacked on a spindle standing upright at the center of a turntable, are dropped on said turntable and played one after another automatically successively.

In such an apparatus, it is necessary to change the rotational speed of the turntable in accordance with the type of the record to be played. In the past, this has been achieved by manually operating a speed changing switch provided on the turntable.

However, the automatic record changer is designed such that a plurality of records are automatically played one after another, once the records have been set in the record changer for play and a play starting lever has been actuated, and the intended object thereof is to play such records with a minimum labor of the user. In this view, it is desirable that the speed of the turntable be changed also automatically.

The record players which have commonly been used heretofore, include those which are provided with means for changing the rotational speed of the turntable by taking advantage of the size of the central hole of an individual record, said means including a control pin which is operated by the weight of the record, whereby the rotational force of the turntable or the point of engagement between a capstan, driven from a motor, and an idler is changed.

However, such means does not always act properly due to the irregularity in dimension and weight of the records, and hence cannot be said to be of high commercial value.

The object of the present invention is to provide a speed changing device which is free of the disadvantage possessed by the conventional device.

Figure 2:
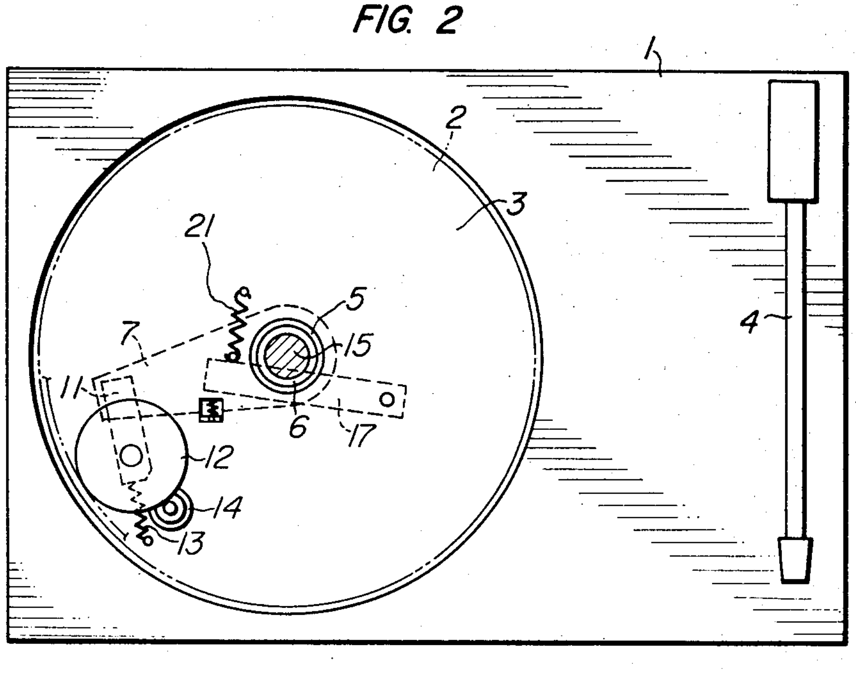
Figure 3:
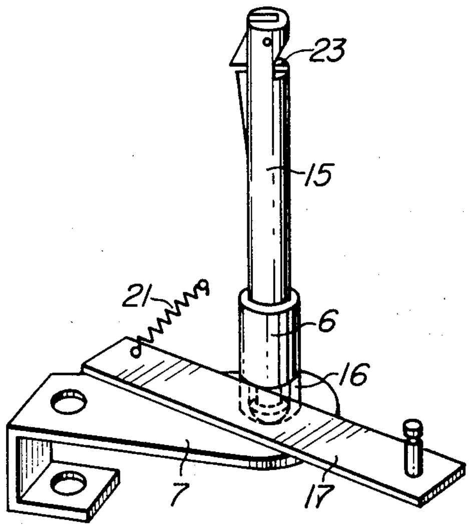

The present invention will be described in detail by way of example with reference to the accompanying drawings. In the drawings, FIG. 1 is a vertical cross-sectional view of the speed changing device;

FIG. 2 is a section taken on line II—II in FIG. 1 showing the state in which a turntable is removed; and FIG. 3 is a perspective view of the principal portion of the speed changing device.

Referring to the drawings, numeral 1 designates a panel which constitutes a base plate of an automatic record player and has a depression 3 formed therein for receiving a turntable 2. A pickup arm 4 is pivotably provided at one end of the panel 1. At the center of the depression 3 is provided an upright turntable shaft 5 on which the turntable 2 is mounted, and a control sleeve 6 is fitted in said turntable shaft 5. The lower end of the control sleeve 6 extends outwardly downwardly of the turntable shaft 5 and has an arm plate 7 connected thereto. The arm plate 7 is constantly urged upwardly by means of a spring 9 which has one end anchored to an intermediate portion of said arm plate, with the other end anchored to a cut-bent lug 8 formed at a portion of the panel 1. A pin 10 is provided at the free end of the arm plate 7 and a supporting plate 11 is rotatably mounted around the top end of said pin 10. An idler 12 is rotatably mounted on a portion of the supporting plate 11 and a spring 13 is provided to bias the supporting plate 11 in such a direction as to hold the idler 12 in pressure engagement with the inner surface of the turntable 2 and with a capstan 14 driven from a motor.

A changer spindle 15 having an annular groove 24 formed at the lower end portion thereof is received in the control sleeve 6 and a clamp plate 17 is in engagement with said annular groove 24 through a cutout 16 formed in said control sleeve 6 to lock said spindle 15, said clamp plate 17 being pivotally connected to the underside of said panel 1 and biased in one direction by a spring 21. The size of the cutout 16 is so selected as to correspond to the stroke of vertical sliding movement of the control sleeve 6.

On the spindle 15 is mounted an adapter 18 to support a disc record which is called a doughnut disc and rotated at 45 r.p.m. The adapter 18 has a bottomed axial bore 19 formed therein for receiving the spindle 15, and a cylindrical pusher 20 is formed at the lower end of said bore 19. Inside of the bore 19 is provided an operating element by which the disc records stacked on the adapter 18 are dropped one after another successively.

When the adapter 18 is mounted on the spindle 15, the pusher 20 of the adapter 18 depressed the top end of the control sleeve 6, causing said control sleeve 6 to move downward. Therefore, the arm plate 7 is moved downward against the biasing force of the spring 9 and the idler 12 is also moved downward through the supporting plate 11, etc. to be set in a position opposite to a larger diameter portion of the capstan 14.

On the other hand, when the adapter 18 is removed from the spindle 15, the arm plate 7 and the control sleeve 8 are moved upward under the biasing force of the spring 9 and the idler 12 is also moved upward to be set in a position opposite to a smaller diameter portion of the capstan 14, thus providing for the rotation of the disc record at a speed of 33 ⅓ r.p.m.

Incidentally, a locking spring 22, such as a leaf spring, is provided in the upper portion of the adapter 18, with a portion thereof projecting into the bore 19. When the adapter 18 is completely mounted on the spindle 15, the locking spring 22 engages a tapered notch 23 formed in the upper portion of the spindle 15, thereby to prevent said adapter 18 from moving off the spindle 15 under the upward biasing force of the spring 9 connected to the arm plate 7.

As described above, the speed changing device according to the present invention makes use of an adapter depending upon the type of the particular disc record to be played. By mounting the adapter on the spindle, the rotational speed of the turntable is automatically changed to accord with the speed designated to the particular record and thereby the manual operation required in operating the record player as automatic record changer can be minimized. Thus, the speed changing device of the invention is of high practical value and highly reliable in operation.

In addition, the speed changing device of the invention is simple in construction, can be produced at a low cost and is trouble-free, and the adapter, when mounted on the spindle, can be securely held in position by the clamping mechanism. Thus, the present invention is of great industrial value.

What is claimed is:

1. A speed changing device for an automatic record player having a turntable comprising, a spindle having a lower end, a plurality of disc records stacked on said spindle being dropped on said turntable one after another successively; an adapter for use with 45 r.p.m. disc records for mounting on said spindle; a control sleeve, said control sleeve being vertically slideably mounted on said spindle and biased constantly upwardly by a spring; an arm plate having one end thereof fixedly connected to said control sleeve; a motor-driven capstan having first and second diameter portions; an idler coupled to the other end of said arm plate and being held in engagement with said capstan and said turntable to transmit the drive of said motor to said turntable, the lower end of said adapter when placed on said spindle depressing said control sleeve and moving said idler from a position opposite a portion of said capstan having said first diameter to a portion of said capstan having said second diameter thereby changing the speed of said turntable.

2. A speed changing device for an automatic record player as defined by claim 5 wherein said record player further comprises a base panel and wherein said speed changing device further comprises a clamp plate coupled to said base panel and engaging an annular groove formed in the lower end of said spindle through a cutout formed in said control sleeve at a location corresponding to that of said clamp plate, the vertical length of said cutout corresponding to the stroke of the vertical sliding movement of said control sleeve, said clamp plate securing said spindle to said base panel.

* * * * *